US010430611B2

(12) United States Patent
Obembe et al.

(10) Patent No.: US 10,430,611 B2
(45) Date of Patent: Oct. 1, 2019

(54) TECHNIQUES AND ARCHITECTURES FOR SELECTIVE OBFUSCATION OF PERSONALLY IDENTIFIABLE INFORMATION (PII) IN ENVIRONMENTS CAPABLE OF REPLICATING DATA

(71) Applicant: salesforce.com, inc., San Francisco, CA (US)

(72) Inventors: Olumayokun Obembe, Concord, CA (US); Gregory Lapouchnian, Toronto (CA); Vijayanth Devadhar, Fremont, CA (US); Jason Woods, Toronto (CA); Karthikeyan Govindarajan, Sunnyvale, CA (US); Ashwini Bijwe, Hayward, CA (US); Prasad Peddada, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 326 days.

(21) Appl. No.: 15/600,521

(22) Filed: May 19, 2017

(65) Prior Publication Data
US 2018/0322306 A1 Nov. 8, 2018

Related U.S. Application Data

(60) Provisional application No. 62/501,003, filed on May 3, 2017.

(51) Int. Cl.
G06F 21/62 (2013.01)
G06F 9/46 (2006.01)
G06F 16/31 (2019.01)
H04L 9/32 (2006.01)
G06F 19/00 (2018.01)

(52) U.S. Cl.
CPC .......... *G06F 21/6254* (2013.01); *G06F 9/466* (2013.01); *G06F 16/31* (2019.01); *G06F 21/6209* (2013.01); *G06F 21/6245* (2013.01); *H04L 9/3239* (2013.01); *G06F 19/32* (2013.01); *H04L 2209/42* (2013.01)

(58) Field of Classification Search
CPC ......... G06F 21/6209; G06F 21/620945; G06F 21/620954
See application file for complete search history.

(56) References Cited

U.S. PATENT DOCUMENTS 5,577,188 A 11/1996 Zhu
5,608,872 A 3/1997 Schwartz et al.
(Continued)

Primary Examiner — Khang Do
(74) Attorney, Agent, or Firm — Jaffery, Watson, Mendonsa & Hamilton, LLP

(57) ABSTRACT

Within one or more instances of a computing environment where an instance is a self-contained architecture to provide at least one database with corresponding search and file system. User information from the one or more instances of the computing environment is organized as zones. A zone is based on one or more characteristics of corresponding user information that are different than the instance to which the user information belongs. User information is selectively obfuscated prior to transmitting blocks of data including the obfuscated user information. The selective obfuscation is based on zone information for one or more zones to which the user information belongs.

27 Claims, 4 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,946,895 B1* | 4/2018 | Kruse ................ G06F 21/6245 |
| 10,079,842 B1* | 9/2018 | Brandwine ......... H04L 63/1416 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0118150 A1* | 5/2008 | Balakrishnan ...... G06F 17/2276 382/176 |
| 2009/0177744 A1 | 7/2009 | Marlow et al. |
| 2011/0277037 A1* | 11/2011 | Burke ................. G06F 21/6245 726/26 |
| 2012/0066769 A1* | 3/2012 | Latchem ............. G06F 21/6245 726/26 |
| 2012/0259894 A1* | 10/2012 | Varley ................ G06F 16/2322 707/795 |
| 2016/0019402 A1* | 1/2016 | Khandelwal .......... H04L 67/306 726/26 |
| 2016/0085982 A1* | 3/2016 | Guirguis ............. G06F 21/6254 726/26 |
| 2016/0127289 A1* | 5/2016 | Papa ...................... H04L 51/12 709/206 |
| 2017/0116428 A1* | 4/2017 | Wu ...................... G06F 21/6209 |
| 2018/0349631 A1* | 12/2018 | Illendula ................ G06F 15/16 |

\* cited by examiner

TECHNIQUES AND ARCHITECTURES FOR SELECTIVE OBFUSCATION OF PERSONALLY IDENTIFIABLE INFORMATION (PII) IN ENVIRONMENTS CAPABLE OF REPLICATING DATA

CLAIM FOR PRIORITY

This application claims the benefit of U.S. Provisional Patent Application 62/501,003 entitled "TECHNIQUES AND ARCHITECTURES FOR SELECTIVE OBFUSCATION OF PERSONALLY IDENTIFIABLE INFORMATION (PII) IN ENVIRONMENTS CAPABLE OF REPLICATING DATA," by Olumayokun Obembe, filed May 3, 2017, the entire contents of which are incorporated herein by reference.

TECHNICAL FIELD

Embodiments relate to techniques for managing replication of data. More particularly, embodiments relate to techniques for selectively obfuscating selected data (e.g., personally identifiable information) when replicating data.

BACKGROUND

Data replication generally refers to the process of copying data. Data replication is a common technique to provide data synchronization as well as other advantages. Data replication is usually an ongoing process in which transactions or other data sets are copied and stored in multiple locations. However, there are conditions under which certain data should not be replicated in the standard manner. This has been a complex situation that has been difficult to solve in a clean and efficient manner.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

As used herein, tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Figure 1:
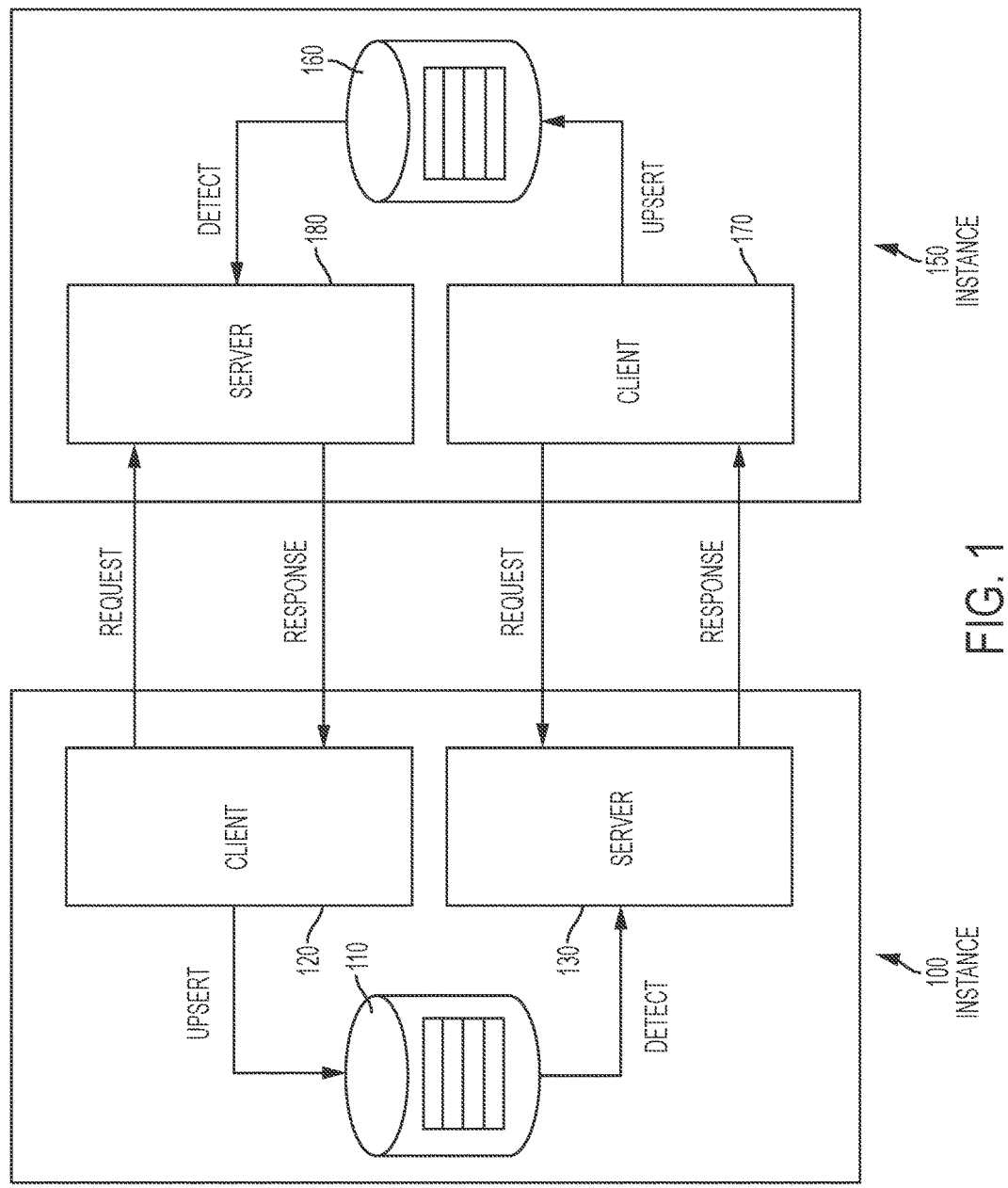
FIG. 1 is one embodiment of a simple replication architecture.

FIG. 1 is one embodiment of a simple replication architecture. Replication is a process where each database instance (e.g., 100, 150) exchanges modified database records for a set of tables with all other instances. The example of FIG. 1 includes only two instances, but any number of instances can be supported. The goal is for replicated tables to be identical everywhere. To support this, processes running within the instances should see an integrated view of the replicated data.

In one embodiment, a group of tenants (or organizations) are grouped together in an instance, or a pod. In instance is a self-contained unit that has all that is required to provide a multitenant platform including, for example, one or more application servers, one or more database servers, at least one database, search and file systems, etc. Each tenant/organization is allocated a pod in which their data resides.

For example, a replicated table can have user information from all users from all instances (e.g., core.all_users) so that users can have access regardless of the instance they are connected to. In many cases, the replication process runs continually in the background on every instance. Each instances acts as a client (e.g., 120, 170) to ask all known peers for updates and as a server (e.g., 130, 180) to provide data to all known peers. However, as discussed herein, replication of some data can have data residency restrictions.

In one embodiment, each instance detects changes to data made within that instance and can package change information into chunks having associated metadata about the changes. These chunks are sent to other instances where they are persisted locally and applied (e.g., upserted) to the corresponding table. In addition to serving their own changes, instances can also act as a proxy for changes made elsewhere (e.g., if they are acting as a "leader" of a pod or data center), in which case peers can request changes that are not their own and the server can reply with a local copy of the changes.

As described herein, replication mechanisms can be provided that determine whether to obfuscate one or more fields in a replicated entity based on properties of a source zone or pod. In one embodiment, all pods are designated either "standard" or "public," but additional and/or different designations could also be supported. In various embodiments, unobfuscated replication is not allowed for personally identifiable information (PII) flowing from standard to public pods.

In various embodiments, one or more pods can be grouped into a zone. Zones can be based on, for example, geography. Zones can be based on other considerations as well, for example, security considerations, licensing levels, customer type. In one embodiment, a zone can be a subset of a data center. In another embodiment, a zone can include subsets of multiple data centers so that the zone spans multiple data centers. Conceptually, a zone is a layer above a data center. The techniques described herein can be useful to, for example, prevent PII data from leaving a set of pods that have data residency requirements.

Many of the examples provided herein are related to data residency and/or data sovereignty requirements; however, the embodiments described herein are more broadly applicable. Data residency and data sovereignty refer to the physical location and legal requirements for data stored in the corresponding geographic location.

Each jurisdiction (e.g., United States, European Union) can have its own data residency laws and requirements.

These laws and requirements can control what data is used (including movement of data) and what data should be protected. For example, the European Union has privacy laws relating to PII. Entities that store and utilize data must comply with these laws and requirements.

Various embodiments are described that can be utilized to comply with data residency requirements. In one example embodiment, four server categories are utilized: 1) Standard; 2) Standard Data Residency; 3) Public; and 4) Public Data Residency. Using these four categories the following three data residency requirements can be enforced: 1) PII cannot leave Standard Data Residency servers unobfuscated; 2) PII data is not sent to Public or Public Data Residency servers unobfuscated; and 3) PII data in a Public server does not leave its geographic region. This is but one example of a configuration to manage data with specific data residency requirements. Other configurations can also be supported.

In one embodiment, replication includes four basic processes: 1) change detection; 2) change serving; 3) change requests; and 4) change upserts. Techniques for each of these processes are described in greater detail below; however, different techniques can also be utilized.

When a row in a replicated table (e.g., core.all_users) is modified, a database trigger writes to an indexing queue table (e.g., core.last_unindexed), containing the partition, entity and date of the change but not the specific rows that changed. A replication change detection chron job periodically runs and pulls aggregates of changed rows and breaks them to manageable segments. The replicator creates chunk definitions based on metadata and caches the chunks to the database so that a subsequent database query is not needed. These chunk definitions are persisted in the database and are ready to serve. This can result in virtual streams of chunks that are independent of each other and can be processed in parallel.

In one embodiment, for deletes, in addition to triggering an indexer, a trigger that writes the deleted key to a table (e.g., core.replication_record_deletion) can be utilized. These delete markers are treated as inserts and updates to that any query that gets modifications from the underlying table gets both together.

In one embodiment, during the change detection process, the underlying records are selected from the data base in order to determine the chunk's properties. In one embodiment, the process can cache a serialized version of the chunk immediately. In one embodiment, to support change detection, a replicated table has a modstamp (or similar) column and a server ID (or similar) column. In general, as a result of the change detection mechanism(s), any modification to the replicated table results in one or more chunks being created that the server can serve on request.

In one embodiment, serving data is a passive process. Requests can be made over a HyperText Transport Protocol (HTTP) and can be served by a servlet running on a web server. In one embodiment, the data are serialized on the server and deserialized by objects on the receiving client.

In various embodiments, the techniques described herein can provide dynamic management of PII protection based on zones and/or categories. In one embodiment, this provides the ability to virtually partition a cloud-based environment to support multiple data residency requirements based on zones. That is, different data residency requirements/restrictions can be supported for different zones. In one embodiment, each zone includes at least one pod, but pods are not required to be completely in the same physical location.

In one embodiment, obfuscation is accomplished utilizing a one-way hash function that is unique, but non-reversible. The original data is protected because the process is non-reversible. The receiving entity/device receives an encrypted string generated from the original data, but because that encryption is non-reversible, the original data (e.g., PII) is protected. Using these techniques, the following PII protection requirements can be provided: PII data is not replicated in the clear from a zone (or pod) of a first category (e.g., a public cloud pod), and PII data is not replicated in the clear from a secure zone (or pod) of a second category (e.g., a government pod, secure corporate zone). Additional and/or different categories can also be supported.

Figure 2:
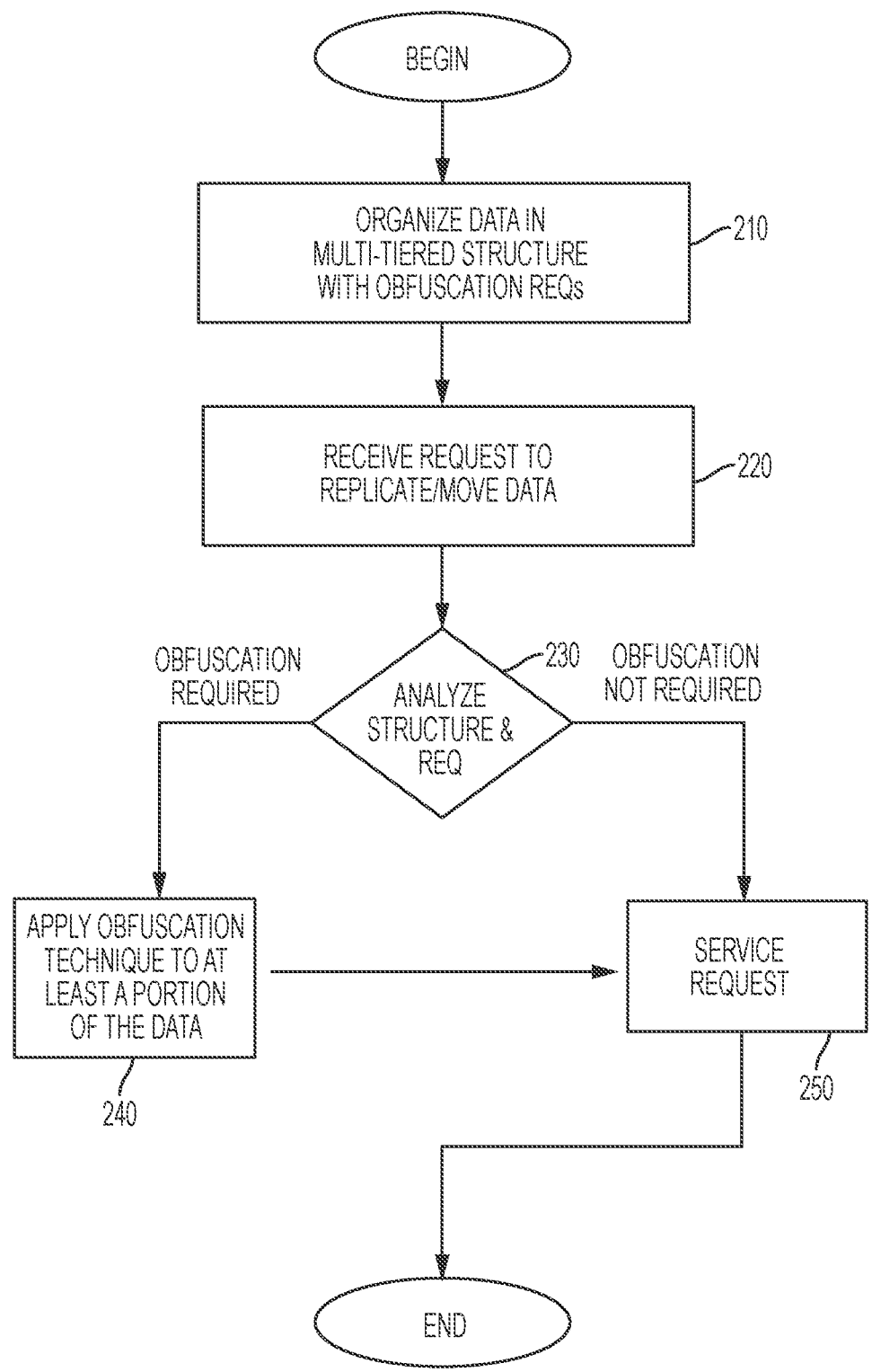
FIG. 2 is a flow diagram of one embodiment of a technique for selectively obfuscating personally identifiable information (PII).

FIG. 2 is a flow diagram of one embodiment of a technique for selectively obfuscating personally identifiable information (PII). While the techniques described with respect to FIG. 2 are directed to PII, these techniques can be used to protect other types of information, for example, organizational information, financial information, etc.

The example of FIG. 2 assumes that data stored within the system has been organized by zones, where zones are a layer above data centers, which can include one or more pods. In the example of FIG. 2, the zones are based on geographic location (e.g., European Union, United States, United Kingdom, Portugal). Zones can be used to organize data in non-geographic groupings as well.

Continuing with the geographic region based zone architecture, each pod can be designated to a zone corresponding to the region in which the pod resides. For example, a pod in a data center located in Italy can be in the zone for Italy or for the European Union (EU). Thus, when data is replicated (or otherwise copied or moved), the data residency requirements can be applied to the data moving out of the pod, if necessary.

Data stored in a computing environment can be organized in a multi-tiered structure with privacy, data residency and/or data security requirements associated with the data or the tiers, 210. In one embodiment, the data is stored in an on-demand services environment that can also provide a multitenant architecture. Various embodiments for on-demand service environments are described in greater detail below.

In one embodiment, data is stored by computing platforms (e.g., server computer systems, desktop computer system) that are physically located in one or more data systems that are organized as pods, zones and/or other groupings. As discussed above, zones can be utilized to group pods by geography and apply data residency and/or PII protection requirements and restrictions.

In one embodiment, zones can be groupings of pods based on geographical locations of data and/or the source of data, each of which can have a corresponding restriction (or limitation) on how the data can be handled. In one embodiment, for example, a zone can correspond to national boundaries such that all data centers within the nation are in the same zone. Other zone configurations can be supported, for example, zones can correspond to service level agreements (SLAs), etc. In some embodiments, data obfuscation can be used to satisfy these requirements; however, in other embodiments, data movement or copying may be prevented.

A request to copy/move/replicate data is received, 220. As discussed above, replication can be an ongoing process that periodically makes backup copies of data and/or changes to existing data. The techniques described herein can also be applied to requests to copy and/or move data. For example, if a user using a computing platform geographically outside of the data residency zone, obfuscation can be applied to the results of the request.

In response to the request, the receiving environment analyzes the structure and corresponding requirements, 230, to determine what (if any) data protection requirements should be applied in servicing the request. In one embodiment, as discussed above, PII portions of the requested data can be obfuscated using various obfuscation techniques, 240 after which the request can be serviced, 250. If obfuscation is not required, 230, the request can be serviced without obfuscation, 250.

Figure 3:
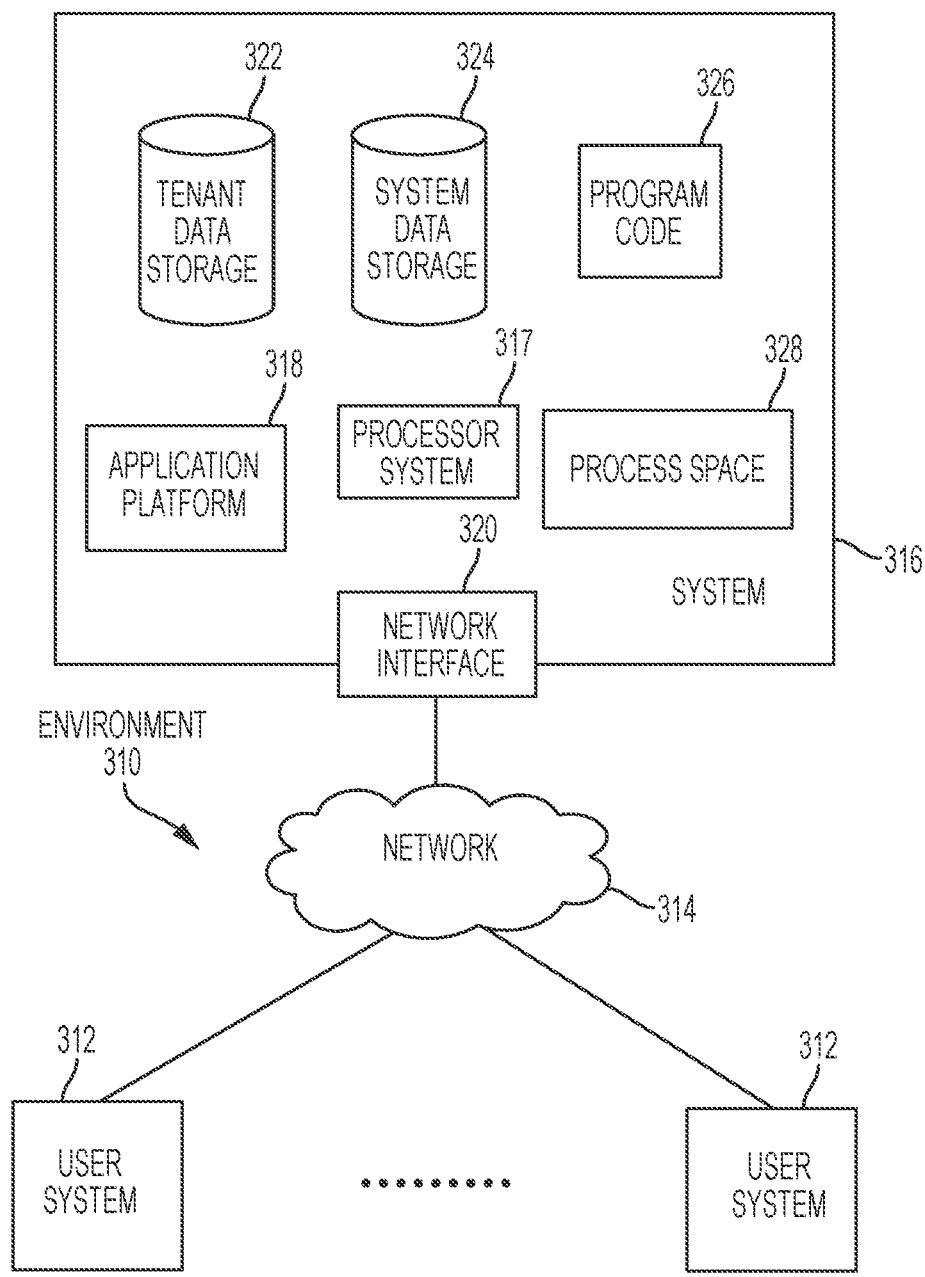
FIG. 3 illustrates a block diagram of an environment where an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Core series processor or the like. Similarly, system 316 (and additional instances of an MTS, where more than one is present) and all of their components might be operator configurable using application(s) including computer code to run using a central processing unit such as processor system 317, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
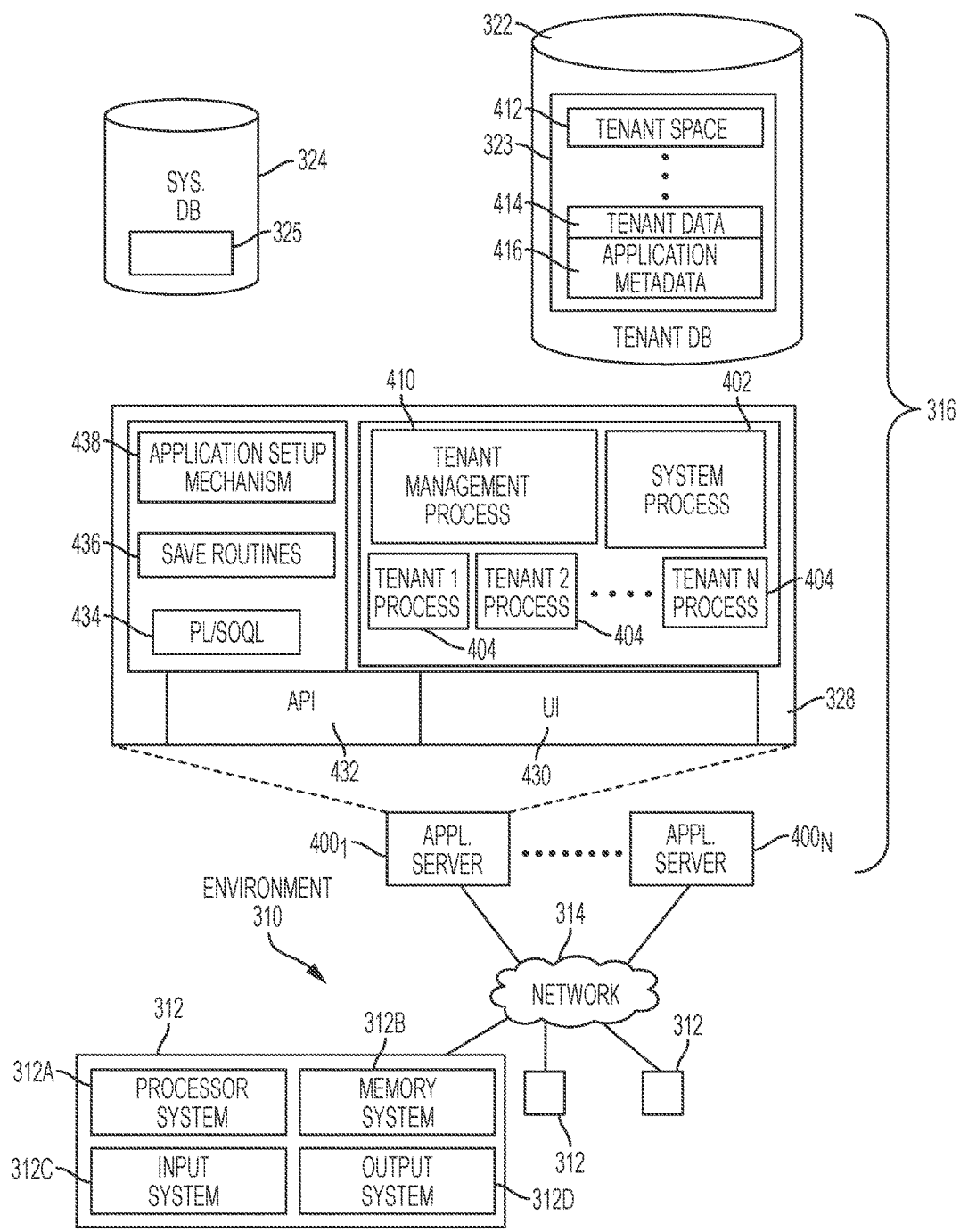
FIG. 4 illustrates a block diagram of an environment where an on-demand database service might be used.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 BIG-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
    a plurality of hardware computing systems each having one or more processors and at least one memory component coupled with the one or more processors, the plurality of hardware computing systems to provide one or more instances of a computing environment, wherein an instance is a self-contained architecture to provide at least one database with corresponding search and file system;
    the plurality of hardware computing systems to organize user information from the one or more instances of the computing environment as zones, wherein a zone is based on one or more characteristics of corresponding user information that are different than the instance to which the user information belongs; and
    the plurality of hardware computing systems to selectively obfuscate user information prior to transmitting blocks of data including the obfuscated user information from a source zone to a destination zone, wherein the selective obfuscation is based on zone information for the source zone and the destination zone.

2. The system of claim 1 wherein the computing environment comprises a multitenant environment, wherein a tenant comprises a group of users who share a common access with specific privileges to a specified instance.

3. The system of claim 2 wherein the multi-tenant architecture provides each tenant with a dedicated share of the specified instance including one or more of tenant specific data, user management, tenant-specific functionality, configuration, customizations, non-functional properties and associated applications.

4. The system of claim 2 wherein the one or more characteristics comprise at least tenant information for the corresponding user information.

5. The system of claim 1 wherein the one or more characteristics comprise at least geographic information for the corresponding user information.

6. The system of claim 1 wherein the one or more characteristics comprise at least security information for the corresponding user information.

7. The system of claim 1 wherein the one or more characteristics comprise at least personally identifiable information (PII) for the corresponding user information.

8. The system of claim 1 wherein the zones comprise a first zone and a second zone, and further wherein replication of data includes obfuscating personally identifiable information (PII) that is to flow from the first zone to the second zone.

9. The system of claim 1 wherein the zones comprise at least one standard zone, and at least one public zone, and further wherein replication of data includes obfuscating personally identifiable information (PII) that is to flow from a first geographic region to a second geographic region.

10. A method implemented within one or more instances of a computing environment, wherein an instance is a self-contained architecture to provide at least one database with corresponding search and file system, the method comprising:
    organizing user information from the one or more instances of the computing environment as zones, wherein a zone is based on one or more characteristics of corresponding user information that are different than the instance to which the user information belongs; and
    selectively obfuscating user information prior to transmitting blocks of data including the obfuscated user information from a source zone to a destination zone, wherein the selective obfuscation is based on zone information for the source zone and the destination zone.

11. The method of claim 10 wherein the computing environment comprises a multitenant environment, wherein a tenant comprises a group of users who share a common access with specific privileges to a specified instance.

12. The method of claim 11 wherein the multi-tenant architecture provides each tenant with a dedicated share of the specified instance including one or more of tenant specific data, user management, tenant-specific functionality, configuration, customizations, non-functional properties and associated applications.

13. The method of claim 11 wherein the one or more characteristics comprise at least tenant information for the corresponding user information.

14. The method of claim 10 wherein the one or more characteristics comprise at least geographic information for the corresponding user information.

15. The method of claim 10 wherein the one or more characteristics comprise at least security information for the corresponding user information.

16. The method of claim 10 wherein the one or more characteristics comprise at least personally identifiable information (PII) for the corresponding user information.

17. The method of claim 10 wherein the zones comprise a first zone and a second zone, and further wherein replication of data includes obfuscating personally identifiable information (PII) that is to flow from the first zone to the second zone.

18. The method of claim 10 wherein the zones comprise at least one standard zone, and at least one public zone, and further wherein replication of data includes obfuscating personally identifiable information (PII) that is to flow from a first geographic region to a second geographic region.

19. A non-transitory computer-readable medium having stored thereon instructions that, when executed, are configurable to cause one or more processors to provide one or more instances of a computing environment, wherein an instance is a self-contained architecture to provide at least one database with corresponding search and file system, the instructions further comprising instructions that, when executed by the one or more processors, cause the one or more processors to:

organize user information from the one or more instances of the computing environment as zones, wherein a zone is based on one or more characteristics of corresponding user information that are different than the instance to which the user information belongs; and selectively obfuscate user information prior to transmitting blocks of data including the obfuscated user information from a source zone to a destination zone, wherein the selective obfuscation is based on zone information for the source zone and the destination zone.

20. The non-transitory computer-readable medium of claim 19 wherein the computing environment comprises a multitenant environment, wherein a tenant comprises a group of users who share a common access with specific privileges to a specified instance.

21. The non-transitory computer-readable medium of claim 20 wherein the multi-tenant architecture provides each tenant with a dedicated share of the specified instance including one or more of tenant specific data, user management, tenant-specific functionality, configuration, customizations, non-functional properties and associated applications.

22. The non-transitory computer-readable medium of claim 20 wherein the one or more characteristics comprise at least tenant information for the corresponding user information.

23. The non-transitory computer-readable medium of claim 19 wherein the one or more characteristics comprise at least geographic information for the corresponding user information.

24. The non-transitory computer-readable medium of claim 19 wherein the one or more characteristics comprise at least security information for the corresponding user information.

25. The non-transitory computer-readable medium of claim 19 wherein the one or more characteristics comprise at least personally identifiable information (PII) for the corresponding user information.

26. The non-transitory computer-readable medium of claim 19 wherein the zones comprise a first zone and a second zone, and further wherein replication of data includes obfuscating personally identifiable information (PII) that is to flow from the first zone to the second zone.

27. The non-transitory computer-readable medium of claim 19 wherein the zones comprise at least one standard zone, and at least one public zone, and further wherein replication of data includes obfuscating personally identifiable information (PII) that is to flow from a first geographic region to a second geographic region.

* * * * *